(12) United States Patent
Matsuda et al.

(10) Patent No.: US 6,658,853 B2
(45) Date of Patent: Dec. 9, 2003

(54) SEAL STRUCTURE FOR COMBUSTOR LINER

(75) Inventors: Yoshihiro Matsuda, Kobe (JP); Masayoshi Kobayashi, Kobe (JP); Takanobu Yoshimura, Akashi (JP); Hiroaki Miyamoto, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/186,424

(22) Filed: Jul. 2, 2002

(65) Prior Publication Data
US 2003/0046940 A1 Mar. 13, 2003

(30) Foreign Application Priority Data
Sep. 12, 2001 (JP) .......................... 2001-275949

(51) Int. Cl.$^7$ ................................. F02C 7/20
(52) U.S. Cl. ................. 60/753; 60/800; 60/804
(58) Field of Search ..................... 60/800, 804, 752, 60/753

(56) References Cited

U.S. PATENT DOCUMENTS

| | | | | |
|---|---|---|---|---|
| 5,265,412 A | * | 11/1993 | Bagepalli et al. | 60/800 |
| 5,289,677 A | * | 3/1994 | Jarrell | 60/796 |
| 5,987,879 A | * | 11/1999 | Ono | 60/800 |
| 2002/0108378 A1 | * | 8/2002 | Ariyoshi et al. | 60/800 |
| 2002/0184892 A1 | * | 12/2002 | Calvez et al. | 60/796 |

FOREIGN PATENT DOCUMENTS

| | | |
|---|---|---|
| JP | A 8-285284 | 11/1996 |
| JP | B2 2852110 | 11/1998 |

* cited by examiner

*Primary Examiner*—Ehud Gartenberg
(74) *Attorney, Agent, or Firm*—Oliff & Berridge, PLC

(57) ABSTRACT

A seal structure for sealing a gap between a combustor liner and a neighboring structure adjacent to the combustor liner, includes an annular sealing member mounted on the neighboring structure so as to be in contact with an annular outer surface of the combustor liner to seal the gap between the combustor liner and the neighboring structure. The annular sealing member includes a plurality of sealing segments which are arranged in an annular form as a whole.

14 Claims, 7 Drawing Sheets

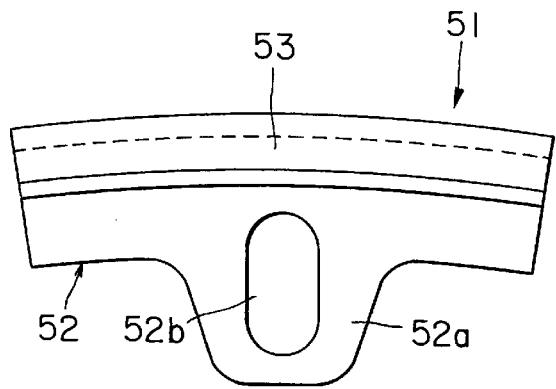
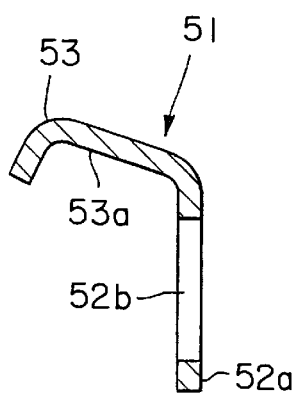
FIG. 7A  FIG. 7B
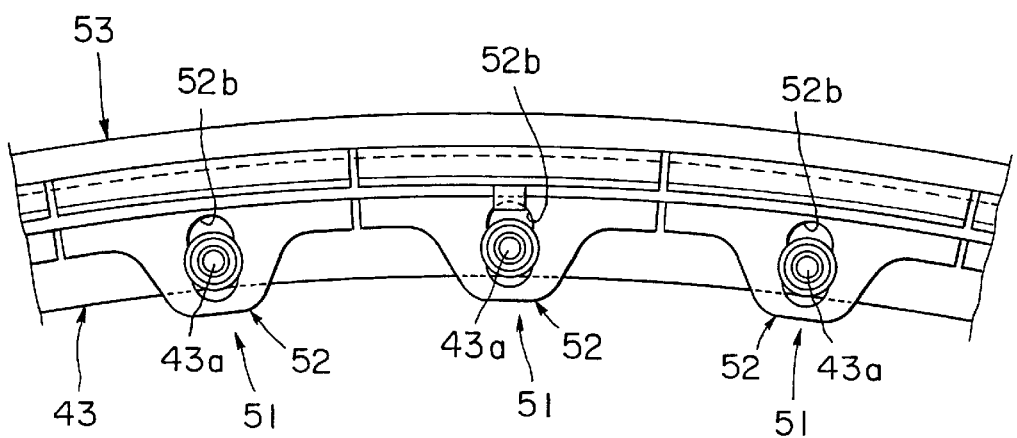
FIG. 8

SEAL STRUCTURE FOR COMBUSTOR LINER

BACKGROUND OF THE INVENTION

1. Field of the Invention

The present invention relates to a seal structure for a combustor liner. More specifically, the present invention relates to a seal structure suitable for a combustor liner included in a gas turbine used in an aircraft engine, etc.

2. Description of the Related Art

The development of ceramic materials, such as ceramic matrix composites (CMCs) superior in heat resistance to metallic materials, has advanced in recent years, and studies have been made to apply ceramic materials to forming combustor liners. A conventional combustor liner formed of a metallic material has a low heat resistance and hence it is difficult to reduce cooling air greatly. A combustor liner formed of a ceramic material having a high heat resistance enables the reduction of cooling air and the improvement of thermal efficiency, and the reduction of emission of nitrogen oxides by using the surplus cooling air for lean-burn combustion.

Generally, ceramic materials are brittle and have coefficients of linear thermal expansion smaller than those of metallic materials. Therefore, when a combustor provided with a ceramic combustor liner operates for combustion, the difference in thermal expansion between the ceramic combustor liner and metallic parts combined with the ceramic combustor liner is large. Thus, seal structures for sealing a gap between the ceramic combustor liner and a neighboring metallic structure must be capable of absorbing the difference in thermal expansion between the combustor liner and the neighboring structure.

As shown in FIGS. 9A and 9B, a conventional combustor liner seal structure disclosed in Japanese Pat. No. 2852110 includes a plate spring 103 which seals gaps between a premixer 101 and a liner 102, and absorbs the displacement of the premixer 101 and the liner 102 relative to each other by the elastic deformation of the plate spring 103. A conventional seal structure disclosed in JP-A No. 285284/1996 includes a plate spring which seals gaps between a liner and a transition piece.

Many conventional combustor liner seal structures utilize the elastic property of a plate spring. Those conventional combustor liner seal structures, however, need to use a plate spring having a small spring constant or a long plate spring in order that a high stress may not be induced in the plate spring due to the difference in thermal expansion between the combustor liner and the associated structure, and the liner may not be excessively loaded.

The difference in thermal expansion between a combustor liner formed of a ceramic material and a structure associated with the combustor liner is very large, and hence a considerably long plate spring is needed to seal gaps between the combustor liner and the associated structure. Such a long plate spring needs a large space for installation.

The necessity of such a large space for installation is a serious disadvantage in aircraft designing in which weight and space reduction is one of the most important subjects. Since a long plate spring is subject to large thermal deformation, the long plate spring has difficulty in maintaining a stable sealing function. This problem will become more serious when a liner of CMC is exposed to higher temperature than that for a liner of metal.

SUMMARY OF THE INVENTION

The present invention has been made in view of the foregoing problems in the related art and it is an object of the present invention to provide a seal structure for sealing a gap between a combustor liner and a neighboring structure, capable of absorbing difference in thermal expansion between the combustor liner and a neighboring structure and of satisfactorily sealing the gap between the combustor liner and the neighboring structure.

According to the first aspect of the present invention, a seal structure for sealing a gap between a combustor liner and a neighboring structure adjacent to the combustor liner, comprises: an annular sealing member mounted on the neighboring structure so as to be in contact with an annular outer surface of the combustor liner to seal the gap between the combustor liner and the neighboring structure, the annular sealing member including a plurality of sealing segments which are arranged in an annular form as a whole.

Preferably, the seal structure further comprises a pressing unit having an annular elastic member to press the sealing segments against the outer surface of the combustor liner.

Preferably, the annular elastic member has a break.

Preferably, each of the sealing segments is supported so as to be movable in a predetermined range.

Preferably, each of the sealing segments is movable in a radial direction.

Preferably, the combustor liner includes an annular outer liner and an annular inner liner which are configured to define an annular combustion chamber together with an annular dome, and the seal structure includes a pair of the annular sealing members which are disposed to seal a gap between the annular outer liner and a neighboring structure adjacent to the annular outer liner and a gap between the annular inner liner and a neighboring structure adjacent to the annular inner liner, respectively.

Preferably, the combustor liner is made of a ceramic material.

According to the second aspect of the present invention, an annular combustor comprises: a combustor liner configured to define an annular combustion chamber, the combustor liner having an annular outer surface; a neighboring structure adjacent to the combustor liner; a seal structure for sealing a gap between the combustor liner and the neighboring structure, the seal structure comprising: an annular sealing member mounted on the neighboring structure so as to be in contact with the annular outer surface of the combustor liner to seal the gap between the combustor liner and the neighboring structure, the annular sealing member including a plurality of sealing segments which are arranged in an annular form as a whole.

Preferably, the seal structure further comprises a pressing unit having an annular elastic member to press the sealing segments against the outer surface of the combustor liner.

Preferably, the annular elastic member has a break.

Preferably, each of the sealing segments is supported so as to be movable in a predetermined range.

Preferably, each of the sealing segments is movable in a radial direction.

Preferably, the combustor liner includes an annular outer liner and an annular inner liner which are configured to define the annular combustion chamber together with an annular dome, and the seal structure includes a pair of the annular sealing members which are disposed to seal a gap between the annular outer liner and a neighboring structure adjacent to the annular outer liner and a gap between the annular inner liner and a neighboring structure adjacent to the annular inner liner, respectively.

Preferably, the combustor liner is made of a ceramic material.

The seal structure of the present invention is capable of satisfactorily sealing the gap between the combustor liner and the neighboring structure without placing an excessive load on the combustor liner even if the difference in thermal expansion between the combustor liner and the neighboring structure is large.

BRIEF DESCRIPTION OF THE DRAWINGS

The above and other objects, features and advantages of the present invention will become more apparent from the following description taken in connection with the accompanying drawings, in which:

FIGS. 7A and 7B are a front elevation and a sectional view, respectively, of an inner sealing member;

FIG. 8 is a fragmentary front elevation of the inner seal structure; and

DESCRIPTION OF THE PREFERRED EMBODIMENTS

Figure 1:
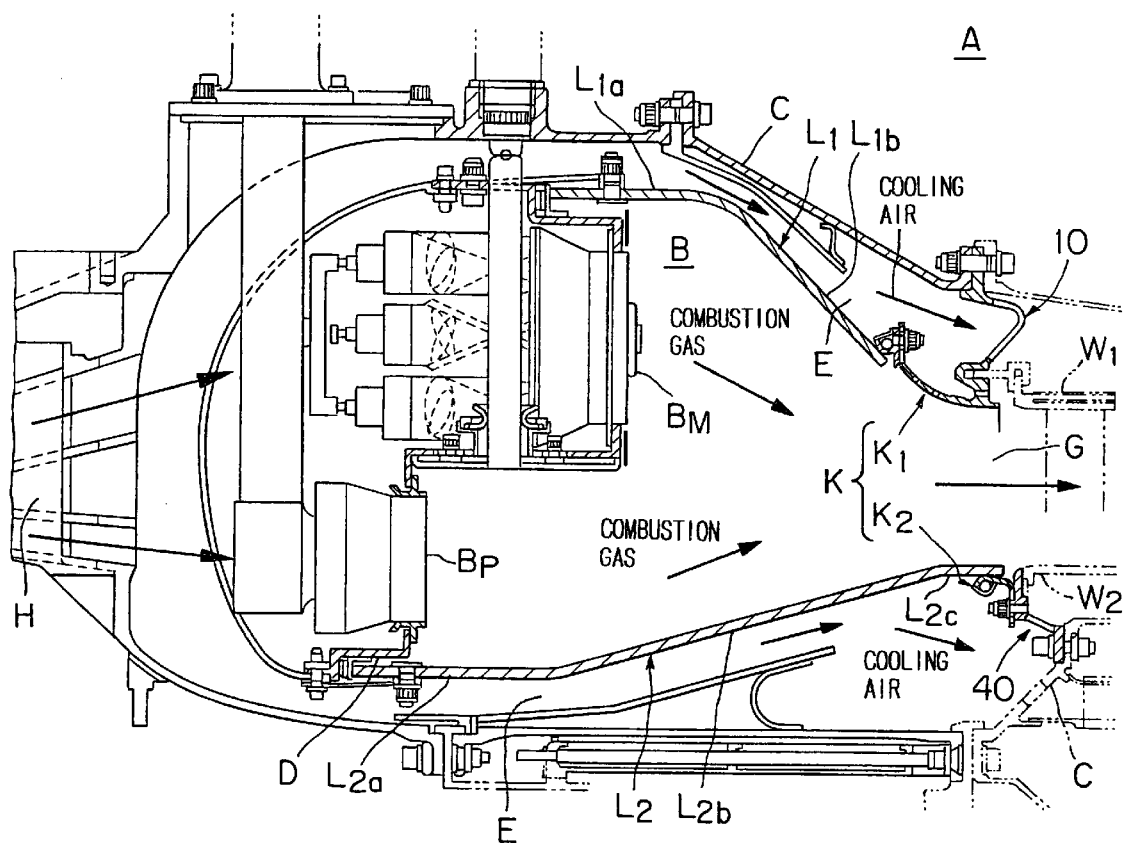
FIG. 1 is a schematic view of a part of an annular combustor provided with a seal structure in a preferred embodiment according to the present invention for sealing gaps between a combustor liner and a neighboring structure.

FIG. 1 shows an upper part of an annular combustor (hereinafter referred to simply as "combustor") A for a gas turbine to be used in, for example, an aircraft engine, provided with a seal structure in a preferred embodiment according to the present invention for sealing gaps between a combustor liner and a neighboring structure adjacent to the combustor liner. The combustor A has a case C covering a combustion chamber B having an axially elongated annular shape.

A main burner $B_M$ and a pilot burner $B_P$ are disposed in the combustion chamber B. The combustion chamber B is defined by a dome D, an outer liner $L_1$, and an inner liner $L_2$. The liners $L_1$ and $L_2$ are formed of a ceramic material, such as a CMC. Spaces between the outer liner $L_1$ and the case C and between the inner liner $L_2$ and the case C are used as cooling air passages E.

The outer liner $L_1$ forms a substantially annular outer wall. The outer liner $L_1$ has a cylindrical part $L_{1a}$ of a fixed diameter extending between a front end joined to the dome D and a middle part, and a taper part $L_{1b}$ extending between the middle part and a rear end and tapering rearward. The rear end of the taper part $L_{1b}$ is connected to an inlet outer circumferential wall member $W_1$ of a turbine by an outer seal structure $K_1$.

The inner liner $L_2$ has a small-diameter cylindrical part $L_{2a}$ of a fixed diameter and a predetermined length, a taper part $L_{2b}$ expanding rearward and extending rearward from the rear end of the cylindrical part $L_{2a}$, and a large-diameter cylindrical part $L_{2c}$ of a fixed diameter and a predetermined length extending rearward from the rear end of the taper part $L_{2b}$. The large-diameter cylindrical part $L_{2c}$ is connected to an inlet circumferential wall member $W_2$ of the turbine by an inner seal structure $K_2$.

An annular space between the respective rear end parts of the outer liner $L_1$ and the inner liner $L_2$ is a combustor outlet G. Namely, the combustor outlet G is formed so as to open in circumference at one axial side of a doughnut shape.

A seal structure K consists of the outer seal structure $K_1$ which seals gaps between rear end of the outer liner L1 and the outer support member 10 to prevent the cooling air from flowing into the combustion chamber B, and the inner seal structure $K_2$ which seals gaps between the rear end of the inner liner $L_2$ and the inner support member 40.

Figure 2:
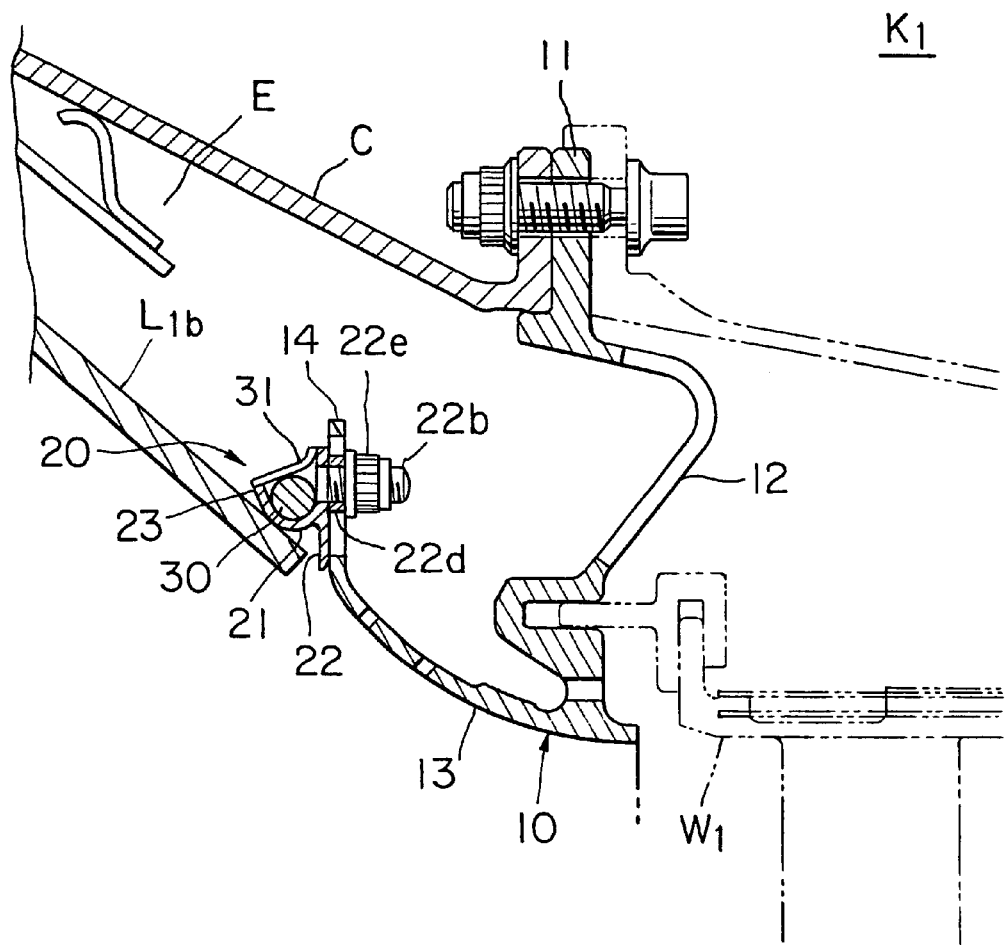
FIG. 2 is a sectional view of an outer seal structure.

Referring to FIG. 2, the outer seal structure $K_1$ includes, as principal components, an outer support member 10 fixed to the case C (neighboring structure), an outer sealing member 20 divided into a plurality of sealing segments 21, and an outer retaining ring (annular elastic member) 30 pressing the outer sealing member 20 against the outer surface of the outer liner $L_1$.

Figure 3C:
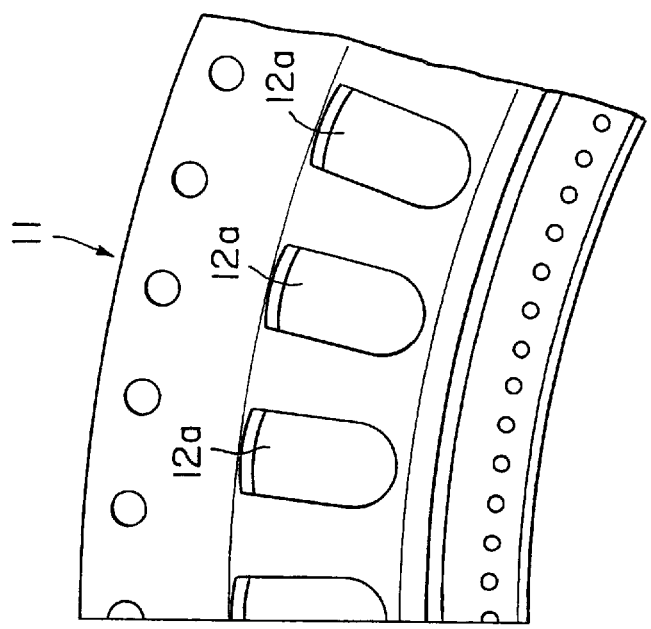
FIGS. 3A, 3B and 3C are a front elevation of a sealing member support member, a sectional view of an outer seal support member, and a back view of the outer seal support member, respectively.
Figure 3B:
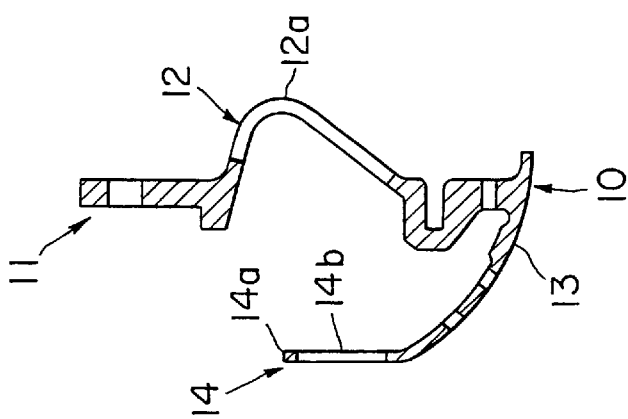
Figure 3A:
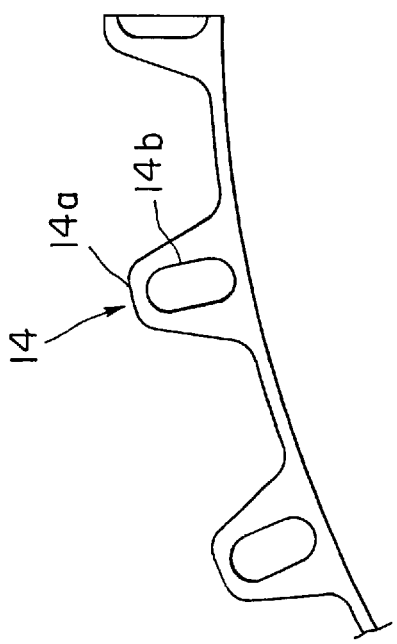

Referring to FIGS. 3A, 3B, and 3C, the outer support member 10 has a generally annular shape, and includes an outer flange 11 fixed to the case C, an intermediate part 12 extending radially inward from the inner edge of the outer flange 11 and curved so as to protrude downstream with respect to the flowing direction of the cooling air flowing through the air passage E, a connecting part 13 extending from the middle part 12 toward the rear end of the outer liner $L_1$, and a sealing member holding part 14 extending radially outward from the front end of the connecting part 13 and holding the sealing member 20.

As shown in FIGS. 3B and 3C, a plurality of openings 12a are formed in the intermediate part 12 at predetermined circumferential intervals.

The cooling air flows downstream through the openings 12a. As shown in FIGS. 3A and 3B, the sealing member holding part 14 is provided with a plurality of radial protrusions 14a arranged at predetermined circumferential intervals, and slots 14b are formed in the radial protrusions 14a, respectively. The number of the radial protrusions 14a is equal to that of the sealing segments 21.

Figure 4A:
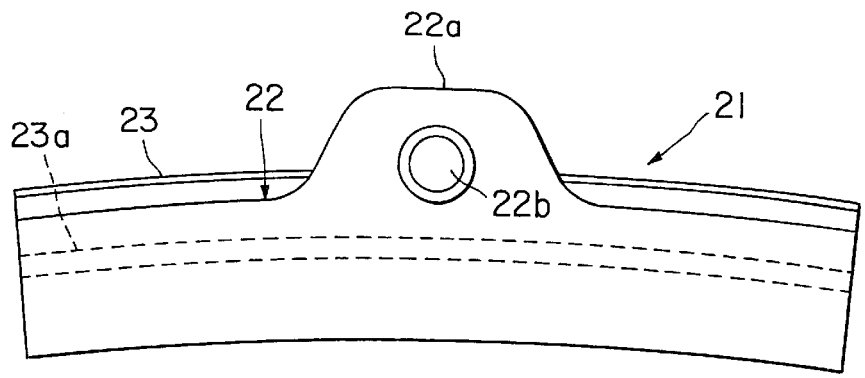
FIGS. 4A and 4B are a back view and a sectional view, respectively, of the outer sealing member.
Figure 4B:
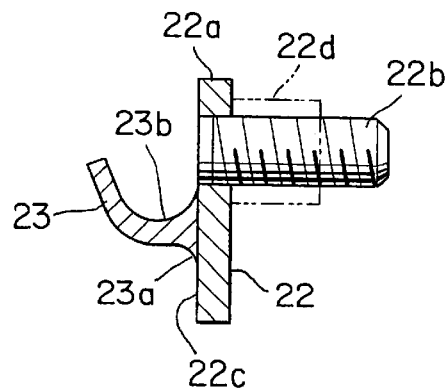

The outer sealing member 20 is divided into a predetermined number of sealing segments 21 as shown in FIGS. 4A and 4B. Namely, the outer sealing member 20 consists of the sealing segments 21 formed by dividing an annular member capable of being in line contact with the outer circumference of the outer liner $L_1$ at predetermined circumferential intervals.

More concretely, each sealing segment 21 has a flat contact part 22 to be brought into contact with the sealing member holding part 14 of the outer support member 10, and a sealing part 23.

A bolt 22b projects from the back surface, i.e., a surface to be in contact with the sealing member holding part 14, of a protruding part 22a of the flat contact part 22 of each sealing segment 21. The bolt 22b is passed through the slot 14b formed in the protrusion 14a of each sealing member holding part 14.

The sealing part 23 extends on the front surface, i.e., a surface facing away from the sealing member support part 14, of the protruding part 22a over the entire length of the sealing segment 21. The sealing part 23 has a base part 23a, and a curved lip 23b curved radially outward and extending from the base part 23a.

Referring to FIG. 2, a spacer 22d (FIG. 4B) is put on the bolt 22b of the sealing segment 21, the bolt 22b is passed through the slot 14b such that the spacer 22d lies in the slot 14b, and a nut 22e is screwed on the bolt 22b to fasten the spacer 22d to the sealing segment 21. The bolt 22b holding the spacer 22d is able to move in the slot 14b, so that the sealing segment 21 is supported on the outer support member 10 so as to be able to move radially in a range defined by the slot 14b relative to the outer support member 10.

The outer retaining ring (annular elastic member) 30 engages in a groove defined by the curved lips 23b of the sealing parts 23 to press the sealing segments 21 against the outer circumference of the outer liner $L_1$. The outer retaining ring 30 has a break so that the outer retaining ring 30 is able to exert a proper resilient pressure on the sealing segments 21 regardless of the difference in thermal expansion between the outer liner $L_1$ and the neighboring structure. A plurality of retaining ring holders 31 are extended across the annular groove defined by the curved lips 23b as shown in FIG. 2 to prevent the outer retaining ring 30 from falling off the curved parts 23b during operation.

Figure 5:
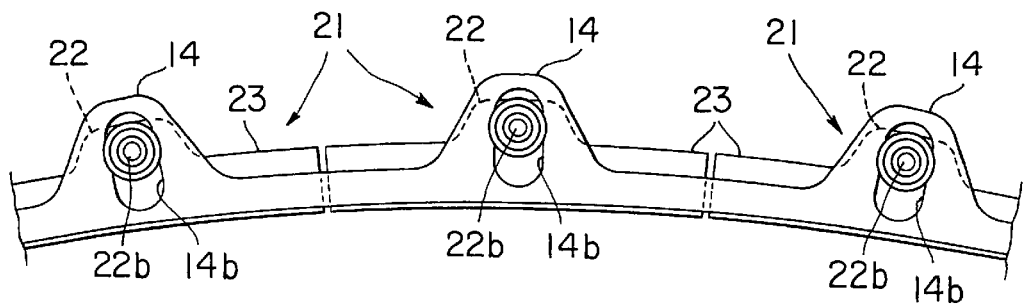
FIG. 5 is a fragmentary back view of an outer seal structure.

FIG. 5 shows some of the sealing segments 21 supported on the outer support member 10.

Figure 6:
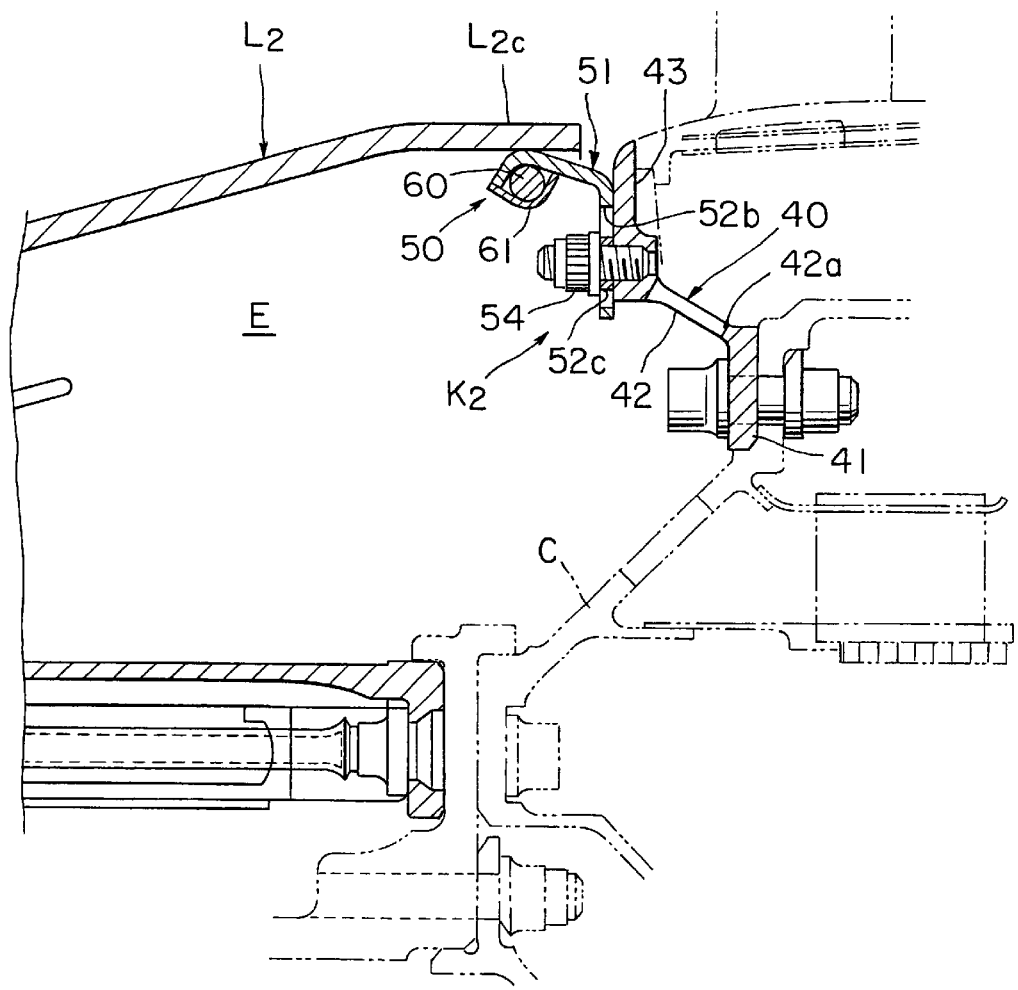
FIG. 6 is a sectional view of an inner seal structure.
Figure 9A:
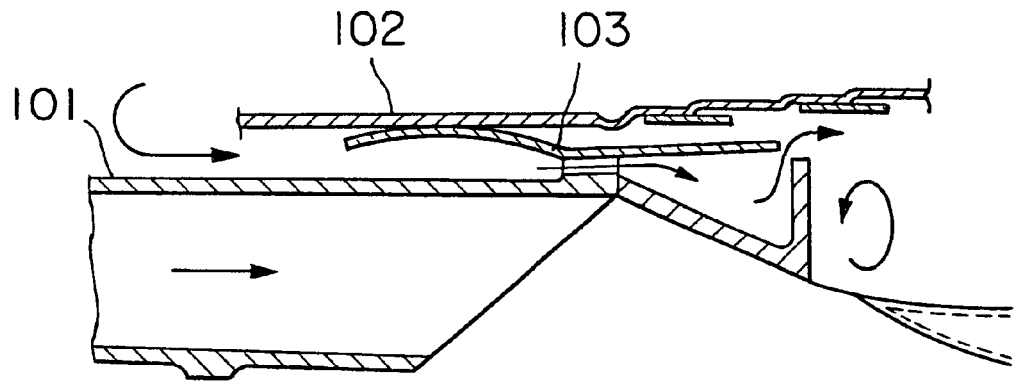
FIGS. 9A and 9B are a sectional view and a partly cutaway perspective view, respectively, of a conventional seal structure.
Figure 9B:
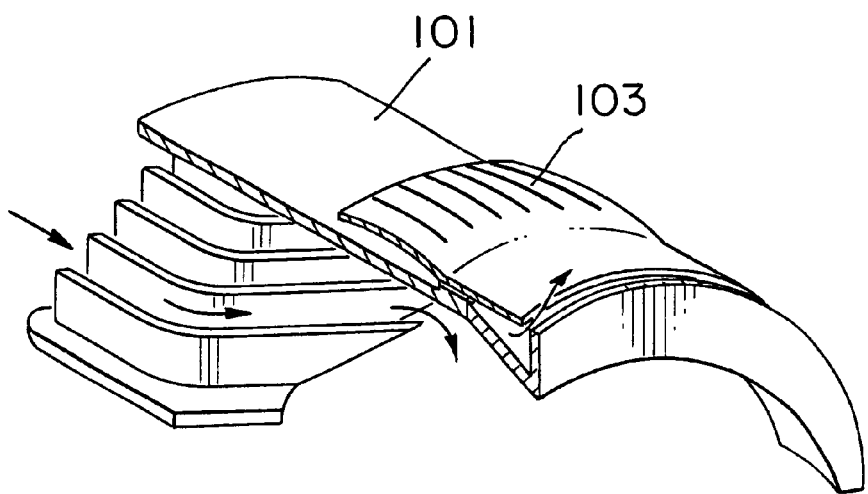

Referring to FIG. 6, the inner seal structure $K_2$ includes, as principal components, an inner support member 40 fixed to the case C (neighboring structure), an inner sealing member 50, and an inner retaining ring (annular elastic member) 60 pressing the inner sealing member 50 against the outer surface of the inner liner $L_2$.

As shown in FIG. 6, the inner support member 40 is a substantially annular member including a radially extending base part 41 fixed to the case C, an intermediate part 42 extending obliquely radially outward toward the upstream of the air passage E from the outer edge of the base part 41, and a sealing member holding part 43 for holding the inner sealing member 50.

A plurality of openings 42a are formed at predetermined circumferential intervals in the intermediate part 42. The cooling air flows through the openings 42a.

The sealing member holding part 43 is provided with a predetermined number of bolts 43a arranged at predetermined circumferential intervals. The number of the bolts 43a is equal to that of inner sealing segments 51.

The inner sealing member 50 consists of a predetermined number of sealing segments 51 as shown in FIGS. 7A and 7B. Namely, the inner sealing member 50 consists of the sealing segments 51 formed by dividing an annular member capable of being in line contact with the outer circumference of the inner liner $L_2$ at predetermined circumferential intervals.

More concretely, each sealing segment 51 has a flat base part 52 to be brought into contact with the sealing member holding part 43 of the inner support member 40, and a sealing lip 53.

A protrusion 52a protruding from the flat base part 52 of each sealing segment 51 is provided with a slot 52b. The bolt 43a of the sealing member holding part 43 is passed through the slot 52b of the protrusion 52a. The sealing lip 53 extends radially outward from the base part 52 and has a curved part 53a having the shape of a hook.

The sealing lip 53 has a sealing surface capable of being brought into line contact with the inner liner $L_2$.

Referring to FIG. 6, a spacer 52c is put on the bolt 43a. The bolt 43a is passed through the slot 52b such that the spacer 52c lies in the slot 52b. A nut 54 is screwed on the bolt 43a to fasten. The bolt 43a holding the spacer 52c is able to move in the slot 52b, so that the sealing segment 51 is supported on the inner support member 40 so as to be able to move radially in a range defined by the slot 52b relative to the inner support member 40.

The inner retaining ring (annular elastic member) 60 engages in a groove defined by the curved parts 53a of the sealing lips 53 to press the sealing segments 51 against the outer circumference of the inner liner $L_2$. The inner retaining ring 60 has a break, so that the inner retaining ring 30 is able to exert a proper resilient pressure on the sealing segments 51 regardless of the difference in thermal expansion between the inner liner $L_2$ and the neighboring structure. As shown in FIG. 6, a plurality of retaining ring holders 61 are extended across the annular groove defined by the curved parts 53a as shown in FIG. 6 to prevent the inner retaining ring 60 from falling off the curved parts 53a during operation.

Thus, the annular sealing members 20 and 50 of the seal structure K consist of the predetermined numbers of sealing segments 21 and 51, respectively. Therefore, excessively high thermal stress is not induced in the sealing members 20 and 50, and the sealing members 20 and 50 do not undergo thermal deformation during the operation of the combustor A and are highly heat-resistant. Thus, the seal structure K is capable of exercising a stable sealing function in sealing gaps between the combustor liners $L_1$ and $L_2$ of a CMC, which is exposed to a temperature higher than that to which a combustor liner of a metal is exposed, and the neighboring structure.

Since the sealing members 20 and 50 have the sealing surfaces capable of being brought into line contact with the liners $L_1$ and $L_2$, heat is transferred at a low heat transfer rate from the liners $L_1$ and $L_2$ to the sealing members 20 and 50. Since the cooling air leaks properly through gaps between the sealing segments 21 and 51, the sealing members 20 and 50 are prevented from overheating and can properly function for a sufficiently long period of use.

Since the spring constants of the retaining rings 30 and 60 may be small, the retaining rings 30 and 60 absorb the difference in thermal expansion between the liners $L_1$ and $L_2$ and the neighboring structures even if the difference is large, so that the load on the liners $L_1$ and $L_2$ can be easily reduced.

The sealing segments 21 and 51 are pressed against the outer liner $L_1$ and the inner liner $L_2$ by the pressure difference between the exterior and the interior of the liners $L_1$ and $L_2$ during the operation of the turbine, so that the sealing function of the seal structure K can be further stabilized.

The process for producing the liner of the ceramic material, which is hard to be worked, can be simplified by using the above-mentioned seal structure.

The use of the combustor liner formed of a ceramic material excellent in heat resistance enables the reduction of the cooling air, improves thermal efficiency, and enables using surplus air for lean-burn combustion to reduce a nitrogen oxide emission.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof. For example, the connecting part 13 of the outer support member 10 of the outer seal structure K₁ may be omitted for a certain type of a combustor.

What is claimed is:

1. A seal structure for sealing a gap between a combustor liner and a neighboring structure adjacent to the combustor liner, comprising:

an annular sealing member mounted on the neighboring structure so as to be in contact with an annular outer surface of the combustor liner to seal the gap between the combustor liner and the neighboring structure, the annular sealing member including a plurality of sealing segments which are arranged in an annular form as a whole.

2. The seal structure according to claim 1, further comprising a pressing unit having an annular elastic member to press the sealing segments against the outer surface of the combustor liner.

3. The seal structure according to claim 2, wherein the annular elastic member has a break.

4. The seal structure according to claim 1, wherein each of the sealing segments is supported so as to be movable in a predetermined range.

5. The seal structure according to claim 4, wherein each of the sealing segments is movable in a radial direction.

6. The seal structure according to claim 1, wherein the combustor liner includes an annular outer liner and an annular inner liner which are configured to define an annular combustion chamber together with an annular dome, and wherein the seal structure includes a pair of the annular sealing members which are disposed to seal a gap between the annular outer liner and a neighboring structure adjacent to the annular outer liner and a gap between the annular inner liner and a neighboring structure adjacent to the annular inner liner, respectively.

7. The seal structure according to claim 1, wherein the combustor liner is made of a ceramic material.

8. An annular combustor comprising:

a combustor liner configured to define an annular combustion chamber, the combustor liner having an annular outer surface;

a neighboring structure adjacent to the combustor liner;

a seal structure for sealing a gap between the combustor liner and the neighboring structure, the seal structure comprising:

an annular sealing member mounted on the neighboring structure so as to be in contact with the annular outer surface of the combustor liner to seal the gap between the combustor liner and the neighboring structure, the annular sealing member including a plurality of sealing segments which are arranged in an annular form as a whole.

9. The annular combustor according to claim 8, wherein the seal structure further comprises a pressing unit having an annular elastic member to press the sealing segments against the outer surface of the combustor liner.

10. The annular combustor according to claim 9, wherein the annular elastic member has a break.

11. The annular combustor according to claim 8, wherein each of the sealing segments is supported so as to be movable in a predetermined range.

12. The annular combustor according to claim 11, wherein each of the sealing segments is movable in a radial direction.

13. The annular combustor according to claim 8, wherein the combustor liner includes an annular outer liner and an annular inner liner which are configured to define the annular combustion chamber together with an annular dome, and wherein the seal structure includes a pair of the annular sealing members which are disposed to seal a gap between the annular outer liner and a neighboring structure adjacent to the annular outer liner and a gap between the annular inner liner and a neighboring structure adjacent to the annular inner liner, respectively.

14. The annular combustor according to claim 8, wherein the combustor liner is made of a ceramic material.

* * * * *